(12) United States Patent
Daussin

(10) Patent No.: US 7,770,643 B2
(45) Date of Patent: Aug. 10, 2010

(54) HYDROCARBON RECOVERY USING FLUIDS

(75) Inventor: Rory Dennis Daussin, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 26 days.

(21) Appl. No.: 11/545,411

(22) Filed: Oct. 10, 2006

(65) Prior Publication Data

US 2008/0083534 A1    Apr. 10, 2008

(51) Int. Cl.
E21B 43/24    (2006.01)

(52) U.S. Cl. .................... 166/272.1; 166/303

(58) Field of Classification Search ......... 166/272.1, 166/275, 272.3, 303
See application file for complete search history.

(56) References Cited

U.S. PATENT DOCUMENTS

| | | |
|---|---|---|
| 1,263,618 A | 4/1918 | Squires |
| 1,342,741 A | 6/1920 | Day |
| 1,457,479 A | 6/1923 | Wolcott |
| 1,726,041 A | 8/1929 | Powell |
| 1,918,076 A | 7/1933 | Woolson |
| 2,173,556 A | 9/1939 | Hixon |
| 2,584,606 A | 2/1952 | Merriam et al. |
| 2,670,802 A | 3/1954 | Ackley |
| 2,734,578 A | 2/1956 | Walter |
| 2,767,791 A | 10/1956 | van Dijck |
| 2,825,408 A | 3/1958 | Watson |
| 2,862,557 A | 12/1958 | van Utenhove et al. |
| 2,880,802 A | 4/1959 | Carpenter |
| 2,889,881 A | 6/1959 | Trantham et al. |
| 2,901,043 A | 8/1959 | Campion et al. |
| 2,914,309 A | 11/1959 | Salomonsson |
| 3,040,809 A | 6/1962 | Pelzer |
| 3,055,427 A | 9/1962 | Pryor et al. |
| 3,113,619 A | 12/1963 | Reichle |
| 3,127,935 A | 4/1964 | Poettmann et al. |
| 3,129,757 A | 4/1964 | Sharp |
| 3,135,326 A | 6/1964 | Santee |
| 3,141,502 A | 7/1964 | Dew et al. |
| 3,154,142 A | 10/1964 | Latta |

(Continued)

FOREIGN PATENT DOCUMENTS

EP    0 088 376 A2    9/1983

(Continued)

OTHER PUBLICATIONS

Claes Palmgren, Institut Francais du Petrole, and Neil Edmunds, "High Temperature Naptha to Replace Steam in the SAGD Process," SPE 30294, Society of Petroleum Engineers, copyright 1995, pp. 475-485.

(Continued)

*Primary Examiner*—William P Neuder
(74) *Attorney, Agent, or Firm*—Joshua A. Griswold

(57) ABSTRACT

The recovery of hydrocarbons from hydrocarbon bearing rock, sands or other geological materials (collectively "rock") uses a recovery fluid. In certain embodiments, the recovery fluid includes miscible compounds or an azeotrope-forming mixture (including an azeotrope), used alone or with other compositions. Two or more compounds in the recovery fluid yield a mixture with different and/or improved characteristics over those of one or more of the component compounds in both liquid and vapor states.

32 Claims, 3 Drawing Sheets

U.S. PATENT DOCUMENTS

| | | |
|---|---|---|
| 3,156,299 A | 11/1964 | Trantham |
| 3,163,215 A | 12/1964 | Stratton |
| 3,174,544 A | 3/1965 | Campion et al. |
| 3,182,722 A | 5/1965 | Reed |
| 3,205,944 A | 9/1965 | Walton |
| 3,221,809 A | 12/1965 | Walton |
| 3,232,345 A | 2/1966 | Trantham et al. |
| 3,237,689 A | 3/1966 | Justheim |
| 3,246,693 A | 4/1966 | Crider |
| 3,294,167 A | 12/1966 | Vogel |
| 3,310,109 A | 3/1967 | Marx et al. |
| 3,314,476 A | 4/1967 | Staples et al. |
| 3,315,745 A | 4/1967 | Rees, Jr. |
| 3,322,194 A | 5/1967 | Strubbar |
| 3,332,482 A | 7/1967 | Trantham |
| 3,334,687 A | 8/1967 | Parker |
| 3,342,257 A | 9/1967 | Jacobs et al. |
| 3,342,259 A | 9/1967 | Powell |
| 3,351,132 A | 11/1967 | Dougan et al. |
| 3,361,201 A | 1/1968 | Howard |
| 3,363,686 A | 1/1968 | Gilchrist |
| 3,363,687 A | 1/1968 | Dean |
| 3,379,246 A | 4/1968 | Sklar et al. |
| 3,379,248 A | 4/1968 | Strange |
| 3,406,755 A | 10/1968 | Sharp |
| 3,411,578 A | 11/1968 | Holmes |
| 3,412,793 A | 11/1968 | Needham |
| 3,412,794 A | 11/1968 | Craighead |
| 3,422,891 A | 1/1969 | Alexander et al. |
| 3,430,700 A | 3/1969 | Satter et al. |
| 3,441,083 A | 4/1969 | Fitzgerald |
| 3,454,095 A | 7/1969 | Messenger et al. |
| 3,454,958 A | 7/1969 | Parker |
| 3,456,721 A | 7/1969 | Smith |
| 3,490,529 A | 1/1970 | Parker |
| 3,490,531 A | 1/1970 | Dixon |
| 3,507,330 A | 4/1970 | Gill |
| 3,547,192 A | 12/1970 | Claridge et al. |
| 3,554,285 A | 1/1971 | Meldau |
| 3,605,888 A | 9/1971 | Crowson et al. |
| 3,608,638 A | 9/1971 | Terwilliger |
| 3,653,438 A | 4/1972 | Wagner |
| 3,685,581 A | 8/1972 | Hess et al. |
| 3,690,376 A | 9/1972 | Zwicky et al. |
| 3,703,927 A | 11/1972 | Harry |
| 3,724,043 A | 4/1973 | Eustance |
| 3,727,686 A | 4/1973 | Prates et al. |
| 3,759,328 A | 9/1973 | Ueber et al. |
| 3,771,598 A | 11/1973 | McBean |
| 3,782,465 A | 1/1974 | Bell et al. |
| 3,782,472 A | 1/1974 | Siess, Jr. |
| 3,796,262 A | 3/1974 | Allen et al. |
| 3,804,169 A | 4/1974 | Closmann |
| 3,805,885 A | 4/1974 | Van Huisen |
| 3,822,747 A | 7/1974 | Maguire, Jr. |
| 3,827,495 A | 8/1974 | Reed |
| 3,837,402 A | 9/1974 | Stringer |
| 3,838,738 A | 10/1974 | Redford et al. |
| 3,847,224 A | 11/1974 | Allen et al. |
| 3,872,924 A | 3/1975 | Clampitt |
| 3,892,270 A | 7/1975 | Lindquist |
| 3,905,422 A | 9/1975 | Woodward |
| 3,929,190 A | 12/1975 | Chang et al. |
| 3,931,856 A | 1/1976 | Barnes |
| 3,941,192 A | 3/1976 | Carlin et al. |
| 3,945,679 A | 3/1976 | Closmann et al. |
| 3,946,809 A | 3/1976 | Hagedorn |
| 3,954,139 A | 5/1976 | Allen |
| 3,958,636 A | 5/1976 | Perkins |
| 3,964,546 A | 6/1976 | Allen |
| 3,967,853 A | 7/1976 | Closmann et al. |
| 3,978,920 A | 9/1976 | Bandyopadhyay et al. |
| 3,993,133 A | 11/1976 | Clampitt |
| 3,994,340 A | 11/1976 | Anderson et al. |
| 3,994,341 A | 11/1976 | Anderson et al. |
| 3,997,004 A | 12/1976 | Wu |
| 3,999,606 A | 12/1976 | Bandyopadhyay et al. |
| 4,004,636 A | 1/1977 | Brown et al. |
| 4,007,785 A | 2/1977 | Allen et al. |
| 4,007,791 A | 2/1977 | Johnson |
| 4,008,765 A | 2/1977 | Anderson et al. |
| 4,019,575 A | 4/1977 | Pisio et al. |
| 4,019,578 A | 4/1977 | Terry et al. |
| 4,020,901 A | 5/1977 | Pisio et al. |
| 4,022,275 A | 5/1977 | Brandon |
| 4,022,280 A | 5/1977 | Stoddard et al. |
| 4,026,358 A | 5/1977 | Allen |
| 4,033,411 A | 7/1977 | Goins |
| 4,037,655 A | 7/1977 | Carpenter |
| 4,037,658 A | 7/1977 | Anderson |
| 4,049,053 A | 9/1977 | Fisher et al. |
| 4,066,127 A | 1/1978 | Harnsberger |
| 4,067,391 A | 1/1978 | Dewell |
| 4,068,715 A | 1/1978 | Wu |
| 4,068,717 A | 1/1978 | Needham |
| 4,078,608 A | 3/1978 | Allen et al. |
| 4,084,637 A | 4/1978 | Todd |
| 4,085,799 A | 4/1978 | Bousaid et al. |
| 4,085,800 A | 4/1978 | Engle et al. |
| 4,088,188 A | 5/1978 | Widmyer |
| 4,099,564 A | 7/1978 | Hutchison |
| 4,114,687 A | 9/1978 | Payton |
| 4,114,691 A | 9/1978 | Payton |
| 4,120,357 A | 10/1978 | Anderson |
| 4,124,071 A | 11/1978 | Allen et al. |
| 4,129,183 A | 12/1978 | Kalfoglou |
| 4,129,308 A | 12/1978 | Hutchison |
| 4,130,163 A | 12/1978 | Bombardieri |
| 4,133,382 A | 1/1979 | Cram et al. |
| 4,133,384 A | 1/1979 | Allen et al. |
| 4,140,180 A | 2/1979 | Bridges et al. |
| 4,140,182 A | 2/1979 | Vriend |
| 4,141,415 A | 2/1979 | Wu et al. |
| 4,144,935 A | 3/1979 | Bridges et al. |
| RE30,019 E | 6/1979 | Lindquist |
| 4,160,479 A | 7/1979 | Richardson et al. |
| 4,160,481 A | 7/1979 | Turk et al. |
| 4,174,752 A | 11/1979 | Slater et al. |
| 4,191,252 A | 3/1980 | Buckley et al. |
| 4,202,168 A | 5/1980 | Acheson et al. |
| 4,202,169 A | 5/1980 | Acheson et al. |
| 4,212,353 A | 7/1980 | Hall |
| 4,217,956 A | 8/1980 | Goss et al. |
| 4,228,853 A | 10/1980 | Harvey et al. |
| 4,228,854 A | 10/1980 | Sacuta |
| 4,228,856 A | 10/1980 | Reale |
| 4,246,966 A | 1/1981 | Stoddard et al. |
| 4,248,302 A | 2/1981 | Churchman |
| 4,249,602 A | 2/1981 | Burton, III et al. |
| 4,250,964 A | 2/1981 | Jewell et al. |
| 4,252,194 A | 2/1981 | Felber et al. |
| 4,257,650 A | 3/1981 | Allen |
| 4,260,018 A | 4/1981 | Shum et al. |
| 4,262,745 A | 4/1981 | Stewart |
| 4,265,310 A | 5/1981 | Britton et al. |
| 4,270,609 A | 6/1981 | Choules |
| 4,271,905 A | 6/1981 | Redford et al. |
| 4,274,487 A | 6/1981 | Hollingsworth et al. |
| 4,280,559 A | 7/1981 | Best |
| 4,282,929 A | 8/1981 | Krajicek |
| 4,284,139 A | 8/1981 | Sweany |
| RE30,738 E | 9/1981 | Bridges et al. |
| 4,289,203 A | 9/1981 | Swanson |
| 4,295,980 A | 10/1981 | Motz |

| Patent No. | Date | Inventor |
|---|---|---|
| 4,296,814 A | 10/1981 | Stalder et al. |
| 4,300,634 A | 11/1981 | Clampitt |
| 4,303,126 A | 12/1981 | Blevins |
| 4,305,463 A | 12/1981 | Zakiewicz |
| 4,306,981 A | 12/1981 | Blair, Jr. |
| 4,319,632 A | 3/1982 | Marr, Jr. |
| 4,319,635 A | 3/1982 | Jones |
| 4,325,432 A | 4/1982 | Henry |
| 4,326,968 A | 4/1982 | Blair, Jr. |
| 4,327,805 A | 5/1982 | Poston |
| 4,330,038 A | 5/1982 | Soukup et al. |
| 4,333,529 A | 6/1982 | McCorquodale |
| 4,344,483 A | 8/1982 | Fisher et al. |
| 4,344,485 A | 8/1982 | Butler |
| 4,344,486 A | 8/1982 | Parrish |
| 4,345,652 A | 8/1982 | Roque |
| 4,362,213 A | 12/1982 | Tabor |
| 4,372,386 A | 2/1983 | Rhoades et al. |
| 4,379,489 A | 4/1983 | Rollmann |
| 4,379,592 A | 4/1983 | Vakhnin et al. |
| 4,380,265 A | 4/1983 | Mohaupt |
| 4,380,267 A | 4/1983 | Fox |
| 4,381,124 A | 4/1983 | Verty et al. |
| 4,382,469 A | 5/1983 | Bell et al. |
| 4,385,661 A | 5/1983 | Fox |
| 4,387,016 A | 6/1983 | Gagon |
| 4,389,320 A | 6/1983 | Clampitt |
| 4,390,062 A | 6/1983 | Fox |
| 4,390,067 A | 6/1983 | Willman |
| 4,392,530 A | 7/1983 | Odeh et al. |
| 4,393,937 A | 7/1983 | Dilgren et al. |
| 4,396,063 A | 8/1983 | Godbey |
| 4,398,602 A | 8/1983 | Anderson |
| 4,406,499 A | 9/1983 | Yildirim |
| 4,407,367 A | 10/1983 | Kydd |
| 4,410,216 A | 10/1983 | Allen |
| 4,411,618 A | 10/1983 | Donaldson et al. |
| 4,412,585 A | 11/1983 | Bouck |
| 4,415,034 A | 11/1983 | Bouck |
| 4,417,620 A | 11/1983 | Shafir |
| 4,418,752 A | 12/1983 | Boyer et al. |
| 4,423,779 A | 1/1984 | Livingston |
| 4,427,528 A | 1/1984 | Lindörfer et al. |
| 4,429,744 A | 2/1984 | Cook |
| 4,429,745 A | 2/1984 | Cook |
| 4,434,851 A | 3/1984 | Haynes, Jr. et al. |
| 4,441,555 A | 4/1984 | Shu |
| 4,444,257 A | 4/1984 | Stine |
| 4,444,261 A | 4/1984 | Islip |
| 4,445,573 A | 5/1984 | McCaleb |
| 4,448,251 A | 5/1984 | Stine |
| 4,450,909 A | 5/1984 | Sacuta |
| 4,450,911 A | 5/1984 | Shu et al. |
| 4,452,491 A | 6/1984 | Seglin et al. |
| 4,453,597 A | 6/1984 | Brown et al. |
| 4,456,065 A | 6/1984 | Heim et al. |
| 4,456,066 A | 6/1984 | Shu |
| 4,456,068 A | 6/1984 | Burrill, Jr. et al. |
| 4,458,756 A | 7/1984 | Clark |
| 4,458,759 A | 7/1984 | Isaacs et al. |
| 4,460,044 A | 7/1984 | Porter |
| 4,465,137 A | 8/1984 | Sustek, Jr. et al. |
| 4,466,485 A | 8/1984 | Shu |
| 4,469,177 A | 9/1984 | Venkatesan |
| 4,471,839 A | 9/1984 | Snavely et al. |
| 4,473,114 A | 9/1984 | Bell et al. |
| 4,475,592 A | 10/1984 | Pachovsky |
| 4,475,595 A | 10/1984 | Watkins et al. |
| 4,478,280 A | 10/1984 | Hopkins et al. |
| 4,478,705 A | 10/1984 | Ganguli |
| 4,480,689 A | 11/1984 | Wunderlich |
| 4,484,630 A | 11/1984 | Chung |
| 4,485,868 A | 12/1984 | Sresty et al. |
| 4,487,262 A | 12/1984 | Venkatesan et al. |
| 4,487,264 A | 12/1984 | Hyne et al. |
| 4,488,600 A | 12/1984 | Fan |
| 4,488,976 A | 12/1984 | Dilgren et al. |
| 4,491,180 A | 1/1985 | Brown et al. |
| 4,498,537 A | 2/1985 | Cook |
| 4,498,542 A | 2/1985 | Eisenhawer et al. |
| 4,499,946 A | 2/1985 | Martin et al. |
| 4,501,325 A | 2/1985 | Frazier et al. |
| 4,501,326 A | 2/1985 | Edmunds |
| 4,501,445 A | 2/1985 | Gregoli |
| 4,503,910 A | 3/1985 | Shu |
| 4,503,911 A | 3/1985 | Hartman et al. |
| 4,508,170 A | 4/1985 | Littmann |
| 4,513,819 A | 4/1985 | Islip et al. |
| 4,515,215 A | 5/1985 | Hermes et al. |
| 4,516,636 A | 5/1985 | Doscher |
| 4,522,260 A | 6/1985 | Wolcott, Jr. |
| 4,522,263 A | 6/1985 | Hopkins et al. |
| 4,524,826 A | 6/1985 | Savage |
| 4,528,104 A | 7/1985 | House et al. |
| 4,530,401 A | 7/1985 | Hartman et al. |
| 4,532,993 A | 8/1985 | Dilgren et al. |
| 4,532,994 A | 8/1985 | Toma et al. |
| 4,535,845 A | 8/1985 | Brown et al. |
| 4,540,049 A | 9/1985 | Hawkins et al. |
| 4,540,050 A | 9/1985 | Huang et al. |
| 4,545,435 A | 10/1985 | Bridges et al. |
| 4,546,829 A | 10/1985 | Martin et al. |
| 4,550,779 A | 11/1985 | Zakiewicz |
| 4,556,107 A | 12/1985 | Duerksen et al. |
| 4,558,740 A | 12/1985 | Yellig, Jr. |
| 4,565,245 A | 1/1986 | Mims et al. |
| 4,565,249 A | 1/1986 | Pebdani et al. |
| 4,572,296 A | 2/1986 | Watkins |
| 4,574,884 A | 3/1986 | Schmidt |
| 4,574,886 A | 3/1986 | Hopkins et al. |
| 4,577,688 A | 3/1986 | Gassmann et al. |
| 4,579,176 A | 4/1986 | Davies et al. |
| 4,589,487 A | 5/1986 | Venkatesan et al. |
| 4,595,057 A | 6/1986 | Deming et al. |
| 4,597,441 A | 7/1986 | Ware et al. |
| 4,597,443 A | 7/1986 | Shu et al. |
| 4,598,770 A | 7/1986 | Shu et al. |
| 4,601,337 A | 7/1986 | Lau et al. |
| 4,601,338 A | 7/1986 | Prats et al. |
| 4,607,695 A | 8/1986 | Weber |
| 4,607,699 A | 8/1986 | Stephens |
| 4,607,700 A | 8/1986 | Duerksen et al. |
| 4,610,304 A | 9/1986 | Doscher |
| 4,612,989 A | 9/1986 | Rakach et al. |
| 4,612,990 A | 9/1986 | Shu |
| 4,615,391 A | 10/1986 | Garthoffner |
| 4,620,592 A | 11/1986 | Perkins |
| 4,620,593 A | 11/1986 | Haagensen |
| 4,635,720 A | 1/1987 | Chew |
| 4,637,461 A | 1/1987 | Hight |
| 4,637,466 A | 1/1987 | Hawkins et al. |
| 4,640,352 A | 2/1987 | Vanmeurs et al. |
| 4,640,359 A | 2/1987 | Livesey et al. |
| 4,641,710 A | 2/1987 | Klinger |
| 4,645,003 A | 2/1987 | Huang et al. |
| 4,645,004 A | 2/1987 | Bridges et al. |
| 4,646,824 A | 3/1987 | Huang et al. |
| 4,648,835 A | 3/1987 | Eisenhawer et al. |
| 4,651,825 A | 3/1987 | Wilson |
| 4,651,826 A | 3/1987 | Holmes |
| 4,653,583 A | 3/1987 | Huang et al. |
| 4,662,438 A | 5/1987 | Taflove et al. |
| 4,662,440 A | 5/1987 | Harmon et al. |
| 4,662,441 A | 5/1987 | Huang et al. |
| 4,665,989 A | 5/1987 | Wilson |
| 4,667,739 A | 5/1987 | Van Meurs et al. |

| | | | | | |
|---|---|---|---|---|---|
| 4,679,626 A | 7/1987 | Perkins | 4,947,933 A | 8/1990 | Jones et al. |
| 4,682,652 A | 7/1987 | Huang et al. | 4,961,467 A | 10/1990 | Pebdani |
| 4,682,653 A | 7/1987 | Angstadt | 4,962,814 A | 10/1990 | Alameddine |
| 4,685,515 A | 8/1987 | Huang et al. | 4,964,461 A | 10/1990 | Shu |
| 4,687,058 A | 8/1987 | Casad et al. | 4,966,235 A | 10/1990 | Gregoli et al. |
| 4,690,215 A | 9/1987 | Roberts et al. | 4,969,520 A | 11/1990 | Jan et al. |
| 4,691,773 A | 9/1987 | Ward et al. | 4,974,677 A | 12/1990 | Shu |
| 4,693,311 A | 9/1987 | Muijs et al. | 4,982,786 A | 1/1991 | Jennings, Jr. |
| 4,694,907 A | 9/1987 | Stahl et al. | 4,983,364 A | 1/1991 | Buck et al. |
| 4,697,642 A * | 10/1987 | Vogel .................... 166/272.3 | 4,991,652 A | 2/1991 | Hoskin et al. |
| 4,699,213 A | 10/1987 | Fleming | 5,010,953 A | 4/1991 | Friedman et al. |
| 4,700,779 A | 10/1987 | Huang et al. | 5,013,462 A | 5/1991 | Danley |
| 4,702,314 A | 10/1987 | Huang et al. | 5,014,787 A | 5/1991 | Duerksen |
| 4,702,317 A | 10/1987 | Shen | 5,016,709 A | 5/1991 | Combe et al. |
| 4,705,108 A | 11/1987 | Little et al. | 5,016,710 A | 5/1991 | Renard et al. |
| 4,706,751 A | 11/1987 | Gondouin | 5,016,713 A | 5/1991 | Sanchez et al. |
| 4,707,230 A | 11/1987 | Ajami | 5,024,275 A | 6/1991 | Anderson et al. |
| 4,718,485 A | 1/1988 | Brown et al. | 5,027,898 A | 7/1991 | Naae |
| 4,718,489 A | 1/1988 | Hallam et al. | 5,036,915 A | 8/1991 | Wyganowski |
| 4,727,489 A | 2/1988 | Frazier et al. | 5,036,917 A | 8/1991 | Jennings, Jr. et al. |
| 4,727,937 A | 3/1988 | Shum et al. | 5,036,918 A | 8/1991 | Jennings, Jr. et al. |
| 4,739,831 A | 4/1988 | Settlemeyer et al. | 5,040,605 A | 8/1991 | Showalter |
| 4,753,293 A | 6/1988 | Bohn | 5,042,579 A | 8/1991 | Glandt et al. |
| 4,756,369 A | 7/1988 | Jennings, Jr. et al. | 5,046,559 A | 9/1991 | Glandt |
| 4,757,833 A | 7/1988 | Danley | 5,046,560 A | 9/1991 | Teletzke et al. |
| 4,759,571 A | 7/1988 | Stone et al. | 5,052,482 A | 10/1991 | Gondouin |
| 4,766,958 A | 8/1988 | Faecke | 5,054,551 A | 10/1991 | Duerksen |
| 4,769,161 A | 9/1988 | Angstadt | 5,056,596 A | 10/1991 | McKay et al. |
| 4,775,450 A | 10/1988 | Ajami | 5,058,681 A | 10/1991 | Reed |
| 4,782,901 A | 11/1988 | Phelps et al. | 5,060,726 A | 10/1991 | Glandt et al. |
| 4,785,028 A | 11/1988 | Hoskin et al. | 5,065,819 A | 11/1991 | Kasevich |
| 4,785,883 A | 11/1988 | Hoskin et al. | 5,083,612 A | 1/1992 | Ashrawi |
| 4,787,452 A | 11/1988 | Jennings, Jr. | 5,083,613 A | 1/1992 | Gregoli et al. |
| 4,793,415 A | 12/1988 | Holmes et al. | 5,085,275 A | 2/1992 | Gondouin |
| 4,804,043 A | 2/1989 | Shu et al. | 5,099,918 A | 3/1992 | Bridges et al. |
| 4,809,780 A | 3/1989 | Shen | 5,101,898 A | 4/1992 | Hong |
| 4,813,483 A | 3/1989 | Ziegler | 5,105,880 A | 4/1992 | Shen |
| 4,817,711 A | 4/1989 | Jeambey | 5,109,927 A | 5/1992 | Supernaw et al. |
| 4,817,714 A | 4/1989 | Jones | 5,123,485 A | 6/1992 | Vasicek et al. |
| 4,818,370 A | 4/1989 | Gregoli et al. | 5,131,471 A | 7/1992 | Duerksen et al. |
| 4,828,030 A | 5/1989 | Jennings, Jr. | 5,145,002 A | 9/1992 | McKay |
| 4,828,031 A | 5/1989 | Davis | 5,145,003 A | 9/1992 | Duerksen |
| 4,828,032 A | 5/1989 | Teletzke et al. | 5,148,869 A | 9/1992 | Sanchez |
| 4,834,174 A | 5/1989 | Vandevier | 5,156,214 A | 10/1992 | Hoskin et al. |
| 4,834,179 A | 5/1989 | Kokolis et al. | 5,167,280 A | 12/1992 | Sanchez et al. |
| 4,844,155 A | 7/1989 | Megyeri et al. | 5,172,763 A | 12/1992 | Mohammadi et al. |
| 4,846,275 A | 7/1989 | McKay | 5,174,377 A | 12/1992 | Kumar |
| 4,850,429 A | 7/1989 | Mims et al. | 5,178,217 A | 1/1993 | Mohammadi et al. |
| 4,856,586 A | 8/1989 | Phelps et al. | 5,186,256 A | 2/1993 | Downs |
| 4,856,587 A | 8/1989 | Nielson | 5,199,490 A | 4/1993 | Surles et al. |
| 4,860,827 A | 8/1989 | Lee et al. | 5,201,815 A | 4/1993 | Hong et al. |
| 4,861,263 A | 8/1989 | Schirmer | 5,215,146 A | 6/1993 | Sanchez |
| 4,867,238 A | 9/1989 | Bayless et al. | 5,215,149 A | 6/1993 | Lu |
| 4,869,830 A | 9/1989 | Konak et al. | 5,236,039 A | 8/1993 | Edelstein et al. |
| 4,874,043 A | 10/1989 | Joseph et al. | 5,238,066 A | 8/1993 | Beattie et al. |
| 4,884,635 A | 12/1989 | McKay et al. | 5,246,071 A | 9/1993 | Chu |
| 4,886,118 A | 12/1989 | Van Meurs et al. | 5,247,993 A | 9/1993 | Sarem et al. |
| 4,892,146 A | 1/1990 | Shen | 5,252,226 A | 10/1993 | Justice |
| 4,895,085 A | 1/1990 | Chips | 5,271,693 A | 12/1993 | Johnson et al. |
| 4,895,206 A | 1/1990 | Price | 5,273,111 A | 12/1993 | Brannan et al. |
| 4,896,725 A | 1/1990 | Parker et al. | 5,277,830 A | 1/1994 | Hoskin et al. |
| 4,901,795 A | 2/1990 | Phelps et al. | 5,279,367 A | 1/1994 | Osterloh |
| 4,903,766 A | 2/1990 | Shu | 5,282,508 A | 2/1994 | Ellingsen et al. |
| 4,903,768 A | 2/1990 | Shu | 5,289,881 A | 3/1994 | Schuh |
| 4,903,770 A | 2/1990 | Friedman et al. | 5,293,936 A | 3/1994 | Bridges |
| 4,915,170 A | 4/1990 | Hoskin | 5,295,540 A | 3/1994 | Djabbarah et al. |
| 4,919,206 A | 4/1990 | Freeman et al. | 5,297,627 A | 3/1994 | Sanchez et al. |
| 4,926,941 A | 5/1990 | Glandt et al. | 5,305,829 A | 4/1994 | Kumar |
| 4,926,943 A | 5/1990 | Hoskin | 5,318,124 A | 6/1994 | Ong et al. |
| 4,928,766 A | 5/1990 | Hoskin | 5,325,918 A | 7/1994 | Berryman et al. |
| 4,930,454 A | 6/1990 | Latty et al. | 5,339,897 A | 8/1994 | Leaute |
| 4,940,091 A | 7/1990 | Shu et al. | 5,339,898 A | 8/1994 | Yu et al. |
| 4,945,984 A | 8/1990 | Price | 5,339,904 A | 8/1994 | Jennings, Jr. et al. |

| | | | | | | |
|---|---|---|---|---|---|---|
| 5,350,014 A | 9/1994 | McKay | | 6,167,966 B1 | 1/2001 | Ayasse et al. |
| 5,358,054 A | 10/1994 | Bert | | 6,173,775 B1 | 1/2001 | Elias et al. |
| 5,361,845 A | 11/1994 | Jamaluddin et al. | | 6,186,232 B1 | 2/2001 | Isaacs et al. |
| 5,377,757 A | 1/1995 | Ng | | 6,189,611 B1 | 2/2001 | Kasevich |
| 5,404,950 A | 4/1995 | Ng et al. | | 6,205,289 B1 | 3/2001 | Kobro |
| 5,407,009 A | 4/1995 | Butler et al. | | 6,230,814 B1 | 5/2001 | Nasr et al. |
| 5,411,086 A | 5/1995 | Burcham et al. | | 6,257,334 B1 | 7/2001 | Cyr et al. |
| 5,411,089 A | 5/1995 | Vinegar et al. | | 6,263,965 B1 | 7/2001 | Schmidt et al. |
| 5,411,094 A | 5/1995 | Northrop | | 6,276,457 B1 | 8/2001 | Moffatt et al. |
| 5,413,175 A | 5/1995 | Edmunds | | 6,285,014 B1 | 9/2001 | Beck et al. |
| 5,415,231 A | 5/1995 | Northrop et al. | | 6,305,472 B2 | 10/2001 | Richardson et al. |
| 5,417,283 A | 5/1995 | Ejiogu et al. | | 6,318,464 B1 | 11/2001 | Mokrys |
| 5,431,224 A | 7/1995 | Laali | | 6,325,147 B1 | 12/2001 | Doerler et al. |
| 5,433,271 A | 7/1995 | Vinegar et al. | | 6,328,104 B1 | 12/2001 | Graue |
| 5,449,038 A | 9/1995 | Horton et al. | | 6,353,706 B1 | 3/2002 | Bridges |
| 5,450,902 A | 9/1995 | Matthews | | 6,357,526 B1 | 3/2002 | Abdel-Halim et al. |
| 5,456,315 A | 10/1995 | Kisman et al. | | 6,409,226 B1 | 6/2002 | Slack et al. |
| 5,458,193 A | 10/1995 | Horton et al. | | 6,412,557 B1 | 7/2002 | Ayasse et al. |
| 5,464,309 A | 11/1995 | Mancini et al. | | 6,413,016 B1 | 7/2002 | Nelson et al. |
| 5,483,801 A | 1/1996 | Craze | | 6,454,010 B1 | 9/2002 | Thomas et al. |
| 5,503,226 A | 4/1996 | Wadleigh | | 6,536,523 B1 | 3/2003 | Kresnyak et al. |
| 5,511,616 A | 4/1996 | Bert | | 6,554,067 B1 | 4/2003 | Davies et al. |
| 5,513,705 A | 5/1996 | Djabbarah et al. | | 6,561,274 B1 | 5/2003 | Hayes et al. |
| 5,531,272 A | 7/1996 | Ng et al. | | 6,581,684 B2 | 6/2003 | Wellington et al. |
| 5,534,186 A | 7/1996 | Walker et al. | | 6,588,500 B2 | 7/2003 | Lewis |
| 5,547,022 A | 8/1996 | Juprasert et al. | | 6,591,906 B2 | 7/2003 | Wellington et al. |
| 5,553,974 A | 9/1996 | Nazarian | | 6,591,908 B2 | 7/2003 | Nasr |
| 5,560,737 A | 10/1996 | Schuring et al. | | 6,607,036 B2 | 8/2003 | Ranson et al. |
| 5,565,139 A | 10/1996 | Walker et al. | | 6,631,761 B2 | 10/2003 | Yuan et al. |
| 5,589,775 A | 12/1996 | Kuckes | | 6,662,872 B2 | 12/2003 | Gutek et al. |
| 5,607,016 A | 3/1997 | Butler | | 6,666,666 B1 | 12/2003 | Gilbert et al. |
| 5,607,018 A | 3/1997 | Schuh | | 6,681,859 B2 | 1/2004 | Hill |
| 5,626,191 A | 5/1997 | Greaves et al. | | 6,688,387 B1 | 2/2004 | Wellington et al. |
| 5,626,193 A | 5/1997 | Nzekwu et al. | | 6,702,016 B2 | 3/2004 | de Rouffignac et al. |
| 5,635,139 A | 6/1997 | Holst et al. | | 6,712,136 B2 | 3/2004 | de Rouffignac et al. |
| 5,650,128 A | 7/1997 | Holst et al. | | 6,712,150 B1 | 3/2004 | Misselbrook et al. |
| 5,660,500 A | 8/1997 | Marsden, Jr. et al. | | 6,715,546 B2 | 4/2004 | Vinegar et al. |
| 5,677,267 A | 10/1997 | Suarez et al. | | 6,715,547 B2 | 4/2004 | Vinegar et al. |
| 5,682,613 A | 11/1997 | Dinatale | | 6,715,548 B2 | 4/2004 | Wellington et al. |
| 5,709,505 A | 1/1998 | Williams et al. | | 6,715,549 B2 | 4/2004 | Wellington et al. |
| 5,713,415 A | 2/1998 | Bridges | | 6,719,047 B2 | 4/2004 | Fowler et al. |
| 5,738,937 A | 4/1998 | Baychar | | 6,722,429 B2 | 4/2004 | de Rouffignac et al. |
| 5,765,964 A | 6/1998 | Calcote et al. | | 6,722,431 B2 | 4/2004 | Karanikas et al. |
| 5,771,973 A | 6/1998 | Jensen et al. | | 6,725,920 B2 | 4/2004 | Zhang et al. |
| 5,788,412 A | 8/1998 | Jatkar | | 6,729,394 B1 | 5/2004 | Hassan et al. |
| RE35,891 E | 9/1998 | Jamaluddin et al. | | 6,729,395 B2 | 5/2004 | Shahin, Jr. et al. |
| 5,803,171 A | 9/1998 | McCaffery et al. | | 6,729,397 B2 | 5/2004 | Zhang et al. |
| 5,803,178 A | 9/1998 | Cain | | 6,729,401 B2 | 5/2004 | Vinegar et al. |
| 5,813,799 A | 9/1998 | Calcote et al. | | 6,732,794 B2 | 5/2004 | Wellington et al. |
| 5,823,631 A | 10/1998 | Herbolzheimer et al. | | 6,732,795 B2 | 5/2004 | de Rouffignac et al. |
| 5,860,475 A | 1/1999 | Ejiogu et al. | | 6,732,796 B2 | 5/2004 | Vinegar et al. |
| 5,899,274 A | 5/1999 | Frauenfeld et al. | | 6,733,636 B1 | 5/2004 | Heins |
| 5,923,170 A | 7/1999 | Kuckes | | 6,736,215 B2 | 5/2004 | Maher et al. |
| 5,931,230 A | 8/1999 | Lesage et al. | | 6,736,222 B2 | 5/2004 | Kuckes et al. |
| 5,941,081 A | 8/1999 | Burgener | | 6,739,394 B2 | 5/2004 | Vinegar et al. |
| 5,957,202 A | 9/1999 | Huang | | 6,742,588 B2 | 6/2004 | Wellington et al. |
| 5,984,010 A | 11/1999 | Elias et al. | | 6,742,593 B2 | 6/2004 | Vinegar et al. |
| 6,000,471 A | 12/1999 | Langset | | 6,745,831 B2 | 6/2004 | de Rouffignac et al. |
| 6,004,451 A | 12/1999 | Rock et al. | | 6,745,832 B2 | 6/2004 | Wellington et al. |
| 6,012,520 A | 1/2000 | Yu et al. | | 6,745,837 B2 | 6/2004 | Wellington et al. |
| 6,015,015 A | 1/2000 | Luft et al. | | 6,755,246 B2 | 6/2004 | Chen et al. |
| 6,016,867 A | 1/2000 | Gregoli et al. | | 6,758,268 B2 | 7/2004 | Vinegar et al. |
| 6,016,868 A | 1/2000 | Gregoli et al. | | 6,782,947 B2 | 8/2004 | de Rouffignac et al. |
| 6,026,914 A | 2/2000 | Adams et al. | | 6,789,625 B2 | 9/2004 | de Rouffignac et al. |
| 6,039,121 A | 3/2000 | Kisman | | 6,794,864 B2 | 9/2004 | Mirotchnik et al. |
| 6,048,810 A | 4/2000 | Baychar | | 6,805,195 B2 | 10/2004 | Vinegar et al. |
| 6,050,335 A | 4/2000 | Parsons | | 6,814,141 B2 | 11/2004 | Huh et al. |
| 6,056,057 A | 5/2000 | Vinegar et al. | | 2001/0009830 A1 | 7/2001 | Baychar |
| 6,102,122 A | 8/2000 | de Rouffignac | | 2001/0017206 A1 | 8/2001 | Davidson et al. |
| 6,109,358 A | 8/2000 | McPhee et al. | | 2001/0018975 A1 | 9/2001 | Richardson et al. |
| 6,148,911 A | 11/2000 | Gipson et al. | | 2002/0029881 A1 | 3/2002 | de Rouffignac et al. |
| 6,158,510 A | 12/2000 | Bacon et al. | | 2002/0033253 A1 | 3/2002 | Rouffignac et al. |
| 6,158,513 A | 12/2000 | Nistor et al. | | 2002/0038710 A1 | 4/2002 | Maher et al. |

| | | |
|---|---|---|
| 2002/0040779 A1 | 4/2002 | Wellington et al. |
| 2002/0046838 A1 | 4/2002 | Karanikas et al. |
| 2002/0056551 A1 | 5/2002 | Wellington et al. |
| 2002/0104651 A1 | 8/2002 | McClung, III |
| 2002/0148608 A1 | 10/2002 | Shaw |
| 2002/0157831 A1 | 10/2002 | Kurlenya et al. |
| 2003/0000711 A1 | 1/2003 | Gutek et al. |
| 2003/0009297 A1 | 1/2003 | Mirotchnik et al. |
| 2003/0015458 A1 | 1/2003 | Nenniger et al. |
| 2003/0042018 A1 | 3/2003 | Huh et al. |
| 2003/0044299 A1 | 3/2003 | Thomas et al. |
| 2003/0051875 A1 | 3/2003 | Wilson |
| 2003/0062159 A1 | 4/2003 | Nasr |
| 2003/0062717 A1 | 4/2003 | Thomas et al. |
| 2003/0079877 A1 | 5/2003 | Wellington et al. |
| 2003/0080604 A1 | 5/2003 | Vinegar et al. |
| 2003/0090424 A1 | 5/2003 | Brune et al. |
| 2003/0098605 A1 | 5/2003 | Vinegar et al. |
| 2003/0102123 A1 | 6/2003 | Wittle et al. |
| 2003/0102124 A1 | 6/2003 | Vinegar et al. |
| 2003/0102126 A1 | 6/2003 | Sumnu-Dindoruk et al. |
| 2003/0102130 A1 | 6/2003 | Vinegar et al. |
| 2003/0111223 A1 | 6/2003 | Rouffignac et al. |
| 2003/0116315 A1 | 6/2003 | Wellington et al. |
| 2003/0127226 A1 | 7/2003 | Heins |
| 2003/0129895 A1 | 7/2003 | Baychar |
| 2003/0131993 A1 | 7/2003 | Zhang et al. |
| 2003/0131994 A1 | 7/2003 | Vinegar et al. |
| 2003/0131995 A1 | 7/2003 | de Rouffignac et al. |
| 2003/0131996 A1 | 7/2003 | Vinegar et al. |
| 2003/0136476 A1 | 7/2003 | O'Hara et al. |
| 2003/0141053 A1 | 7/2003 | Yuan et al. |
| 2003/0141065 A1 | 7/2003 | Karanikas et al. |
| 2003/0141066 A1 | 7/2003 | Karanikas et al. |
| 2003/0141067 A1 | 7/2003 | Rouffignac et al. |
| 2003/0141068 A1 | 7/2003 | de Rouffignac et al. |
| 2003/0155111 A1 | 8/2003 | Vinegar et al. |
| 2003/0159828 A1 | 8/2003 | Howard et al. |
| 2003/0164234 A1 | 9/2003 | de Rouffignac et al. |
| 2003/0164239 A1 | 9/2003 | Wellington et al. |
| 2003/0173072 A1 | 9/2003 | Vinegar et al. |
| 2003/0173080 A1 | 9/2003 | Berchenko et al. |
| 2003/0173081 A1 | 9/2003 | Vinegar et al. |
| 2003/0173082 A1 | 9/2003 | Vinegar et al. |
| 2003/0173086 A1 | 9/2003 | Howard et al. |
| 2003/0178191 A1 | 9/2003 | Maher et al. |
| 2003/0183390 A1 | 10/2003 | Veenstra et al. |
| 2003/0192691 A1 | 10/2003 | Vinegar et al. |
| 2003/0192693 A1 | 10/2003 | Wellington |
| 2003/0196788 A1 | 10/2003 | Vinegar et al. |
| 2003/0196789 A1 | 10/2003 | Wellington et al. |
| 2003/0196801 A1 | 10/2003 | Vinegar et al. |
| 2003/0196810 A1 | 10/2003 | Vinegar et al. |
| 2003/0201098 A1 | 10/2003 | Karanikas et al. |
| 2003/0205378 A1 | 11/2003 | Wellington et al. |
| 2003/0209348 A1 | 11/2003 | Ward et al. |
| 2003/0223896 A1 | 12/2003 | Gilbert et al. |
| 2004/0007500 A1 | 1/2004 | Kresnyak |
| 2004/0020642 A1 | 2/2004 | Vinegar et al. |
| 2004/0040715 A1 | 3/2004 | Wellington et al. |
| 2004/0050547 A1 | 3/2004 | Limbach |
| 2004/0112586 A1 | 6/2004 | Matthews et al. |
| 2004/0116304 A1 | 6/2004 | Wu et al. |
| 2004/0118783 A1 | 6/2004 | Myers et al. |
| 2004/0140095 A1 | 7/2004 | Vinegar et al. |
| 2004/0140096 A1 | 7/2004 | Sandberg et al. |
| 2004/0144540 A1 | 7/2004 | Sandberg et al. |
| 2004/0144541 A1 | 7/2004 | Picha et al. |
| 2004/0145969 A1 | 7/2004 | Bai et al. |
| 2004/0146288 A1 | 7/2004 | Vinegar et al. |
| 2004/0154793 A1 | 8/2004 | Zapadinski |
| 2004/0177966 A1 | 9/2004 | Vinegar et al. |
| 2004/0204324 A1 | 10/2004 | Baltoiu et al. |
| 2004/0211554 A1 | 10/2004 | Vinegar et al. |
| 2004/0211569 A1 | 10/2004 | Vinegar et al. |
| 2004/0261729 A1 | 12/2004 | Sarkar |
| 2005/0006097 A1 | 1/2005 | Sandberg et al. |
| 2005/0026094 A1 | 2/2005 | Sanmiguel et al. |
| 2006/0172893 A1* | 8/2006 | Todd et al. .................. 507/203 |
| 2008/0053920 A1* | 3/2008 | Pakulski et al. ............. 210/749 |

FOREIGN PATENT DOCUMENTS

| | | |
|---|---|---|
| EP | 0 144 203 A2 | 6/1985 |
| EP | 0 158 486 A1 | 10/1985 |
| EP | 0 226 275 A1 | 6/1987 |
| EP | 0 261 793 A1 | 3/1988 |
| EP | 0 269 231 A1 | 6/1988 |
| EP | 0 283 602 A1 | 9/1988 |
| EP | 0 295 712 A2 | 12/1988 |
| EP | 0 341 976 A2 | 11/1989 |
| EP | 0 387 846 A1 | 9/1990 |
| EP | 0 420 656 A2 | 4/1991 |
| EP | 0 747 142 A1 | 12/1996 |
| FR | 2 852 713 | 9/2004 |
| GB | 1 457 696 | 12/1976 |
| GB | 1 463 444 | 2/1977 |
| GB | 2 031 975 | 4/1980 |
| GB | 1 585 742 | 3/1981 |
| GB | 2 062 065 | 5/1981 |
| GB | 2 138 869 | 10/1984 |
| GB | 2 156 400 | 10/1985 |
| GB | 2 164 978 | 4/1986 |
| GB | 2 177 141 | 1/1987 |
| GB | 2 196 665 | 5/1988 |
| GB | 2 219 818 | 12/1989 |
| GB | 2 257 184 | 1/1993 |
| GB | 2 272 465 | 5/1994 |
| GB | 2 286 001 | 8/1995 |
| GB | 2 340 152 | 2/2000 |
| GB | 2 357 528 | 6/2001 |
| GB | 2 362 333 | 11/2001 |
| GB | 2 363 587 | 1/2002 |
| GB | 2 391 890 | 2/2004 |
| GB | 2 391 891 | 2/2004 |
| GB | 2 403 443 | 12/2004 |
| WO | WO 82/01214 | 4/1982 |
| WO | WO 86/03251 | 6/1986 |
| WO | WO 87/07293 | 12/1987 |
| WO | WO 89/12728 | 12/1989 |
| WO | WO 92/18748 | 10/1992 |
| WO | WO 93/16338 | 8/1993 |
| WO | WO 93/23134 | 11/1993 |
| WO | WO 94/21886 | 9/1994 |
| WO | WO 94/21889 | 9/1994 |
| WO | WO 95/16512 | 6/1995 |
| WO | WO 96/16729 | 6/1996 |
| WO | WO 96/32566 | 10/1996 |
| WO | WO 96/35858 | 11/1996 |
| WO | WO 97/01017 | 1/1997 |
| WO | WO 97/12119 | 4/1997 |
| WO | WO 97/35090 | 9/1997 |
| WO | WO 98/04807 | 2/1998 |
| WO | WO 98/37306 | 8/1998 |
| WO | WO 98/40603 | 9/1998 |
| WO | WO 98/40605 | 9/1998 |
| WO | WO 98/45733 | 10/1998 |
| WO | WO 98/50679 | 11/1998 |
| WO | WO 99/30002 | 6/1999 |
| WO | WO 99/67503 | 12/1999 |
| WO | WO 99/67504 | 12/1999 |
| WO | WO 99/67505 | 12/1999 |
| WO | WO 00/23688 | 4/2000 |
| WO | WO 00/25002 | 5/2000 |
| WO | WO 00/66882 | 11/2000 |
| WO | WO 00/67930 | 11/2000 |

| | | | |
|---|---|---|---|
| WO | WO 01/06089 A1 | 1/2001 |
| WO | WO 01/27439 A1 | 4/2001 |
| WO | WO 01/81239 A2 | 11/2001 |
| WO | WO 01/81505 A1 | 11/2001 |
| WO | WO 01/81710 A1 | 11/2001 |
| WO | WO 01/81715 A2 | 11/2001 |
| WO | WO 01/92673 A2 | 12/2001 |
| WO | WO 01/92684 A1 | 12/2001 |
| WO | WO 01/92768 A2 | 12/2001 |
| WO | WO 02/086018 A2 | 10/2002 |
| WO | WO 02/086276 A2 | 10/2002 |
| WO | WO 03/010415 A1 | 2/2003 |
| WO | WO 03/036033 A1 | 5/2003 |
| WO | WO 03/036038 A2 | 5/2003 |
| WO | WO 03/036039 A1 | 5/2003 |
| WO | WO 03/036043 A2 | 5/2003 |
| WO | WO 03/038230 A2 | 5/2003 |
| WO | WO 03/038233 A1 | 5/2003 |
| WO | WO 03/040513 A2 | 5/2003 |
| WO | WO 03/040762 A1 | 5/2003 |
| WO | WO 03/053603 A2 | 7/2003 |
| WO | WO 03/054351 A1 | 7/2003 |
| WO | WO 03/062596 A | 7/2003 |
| WO | WO 03/100257 A1 | 12/2003 |
| WO | WO 2004/038173 A1 | 5/2004 |
| WO | WO 2004/038174 A2 | 5/2004 |
| WO | WO 2004/038175 A1 | 5/2004 |
| WO | WO 2004/050567 A1 | 6/2004 |
| WO | WO 2004/050791 A1 | 6/2004 |
| WO | WO 2004/097159 A2 | 11/2004 |
| WO | WO 2005/007776 A1 | 1/2005 |
| WO | WO 2005/012688 A1 | 2/2005 |

OTHER PUBLICATIONS

X. Deng, "*Recovery Performance and Economics of Steam/Propane Hybrid Process*," SPE/PS-CIM/CHOA 97760, PS2005-341, SPE/PS-CIM/CHOA International Thermal Operations and Heavy Oil Symposium, copyright 2005, pp. 1-7.

Presentation by Daulat D. Mamora, "*Thermal Oil Recovery Research at Texas A&M in the Past Five Years—an Overview*," Crisman Institute Halliburton Center for Unconventional Resources, Research Meeting Aug. 3, 2006, Department of Petroleum Engineering, Texas A&M University (13 pages).

Presentation by Namit J. Jaiswal, "*Experimental and Analytical Studies of Hydrocarbon Yields Under Dry-, Steam-, and Steam with Propane-Distillation*," Crisman Institute's Halliburton Center for Unconventional Resources, Aug. 3, 2006, Department of Petroleum Engineering, Texas a&M University (5 pages).

Presentation by Jose A. Rivero, "*An Experimental Study of Steam and Steam-Propane Injection Using a Novel Smart Horizontal Producer to Enhance Oil Production in the San Ardo Field*," Sponsor's Meeting, Crisman Institute, Aug. 3, 2006, Department of Petroleum Engineering, Texas A&M University (7 pages).

National Energy Board, "*Canada's Oil Sands: Opportunities and Challenges to 2015*," An Energy Market Assessment, May 2004 (158 pages).

K.C. Hong, "Recent Advances in Steamflood Technology," SPE 54078, Copyright 1999, Society of Petroleum Engineers, Inc., 14 pages.

Gary R. Greaser and J. Raul Ortiz, "New Thermal Recovery Technology and Technology Transfer for Successful Heavy Oil Development," SPE 69731, Copyright 2003, Society of Petroleum Engineers, Inc., 7 pages.

A.J. Mulac, J.A. Beyeloer, R.G. Clay, K.R. Darnall, A.B. Donaldson, T.D. Donham, R.L. Fox, D.R. Johnson and R.L. Maxwell, "Project Deep Steam Preliminary Field Test Bakersfield, California," SAND80-2843, Printed Apr. 1981, 62 pages.

Website: http://www.oceaneering.com/Brochures/MFX%20-%Oceaneering%20Multiflex.pdf, Oceaneering Multiflex, Oceaneering International, Incorporated, printed Nov. 23, 2005, 2 pages.

NTIS, Downhole Steam-Generator Study. vol. 1, Conception and Feasibility Evaluation. Final Report, Sep. 1978-Sep. 1980, Sandia National Labs, Albuquerque NM, Jun. 1982. 260 pages.

Notification of Transmittal of the International Search Report and the Written Opinion of the International Searching Authority, or the Declaration (2 pages), International Search Report (4 pages), and Written Opinion of the International Searching Authority (6 pages) for International Application No. PCT/US2007/080985 mailed Feb. 28, 2008.

Notification Concerning Transmittal of International Preliminary Report on Patentability (2 pages); Written Opinion of the International Searching Authority (6 pages); all mailed on Apr. 23, 2009 in PCT International Application No. PCT/US2007/080985 filed Oct. 10, 2007 (Total 8 pages).

* cited by examiner

HYDROCARBON RECOVERY USING FLUIDS

BACKGROUND

The present disclosure relates to recovery of hydrocarbons, and more particularly, to the recovery of hydrocarbons using a recovery fluid.

The hydrocarbons residing in some geological formations are of a high viscosity. These high viscosity hydrocarbons are referred to generally as heavy oil, and can include high viscosity oil, tar, bitumen, and asphalt. Because of their high viscosity, these hydrocarbons are not mobile within the formation, and are thus difficult to recover. In the past, the high viscosity hydrocarbons remained untapped due to an inability to economically recover them. More recently, as the demand for oil has increased, commercial operations have expanded to the recovery of such heavy oil deposits. In some circumstances, the application of heated fluids (e.g., steam) or solvents to the formation are used to reduce the viscosity of the hydrocarbons. Reducing the viscosity of the hydrocarbons mobilizes them within the formation and permits their extraction to the surface. The methods by which heavy oils are recovered, however, are still evolving. Improvements in the operational efficiencies of these methods decrease the cost of recovering heavy oils and may make additional deposits economically viable.

SUMMARY

The concepts described herein encompass improvements to the recovery of hydrocarbons from hydrocarbon bearing rock, sands or other geological materials (collectively "rock") using a recovery fluid. In certain embodiments, the recovery fluid includes a mixture of miscible compounds, such as an aqueous solution having a water-miscible solvent to hydrocarbons, used alone or with other compositions. In certain embodiments, the recovery fluid includes azeotrope-forming compounds, such as a base compound and a solvent to hydrocarbon, used alone or with other compositions. Two or more compounds in the recovery fluid that are miscible or that form an azeotropic mixture may yield different and/or improved characteristics over those of one or more of the component compounds in both liquid and vapor states.

Although there are many variations that fall within the scope of the concepts described herein, one aspect encompasses a method where a vaporized recovery fluid comprising an aqueous solution having a water-miscible solvent is received and at least a portion of the vapor is contacted with a hydrocarbon in rock.

Another aspect encompasses a method where a liquid recovery fluid comprising an aqueous solution having a water-miscible solvent is heated and at least a portion of the recovery fluid is introduced into a hydrocarbon bearing rock.

Another aspect encompasses a method where the viscosity of a hydrocarbon is lowered with an aqueous solution having a water-miscible solvent and the hydrocarbon is recovered.

In some instances, the rock is in-situ. The rock may also be at the surface. The recovery fluid can be a number of different compounds. In some instances, the water-miscible solvent includes a solvent that forms an azeotrope with water. One example class of solvents that are miscible in, and in some instances, form an azeotrope with water is alcohol. Some example alcohols that form an azeotrope with water include ethanol, diacetone alcohol, sec-butyl alcohol, isopropyl alcohol and others. The recovery fluid may also include an antioxidant, an oxygen scavenger, a corrosion inhibitor and/or other compounds, azeotropically (or that form azeotropes) with another compound or not.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1A:
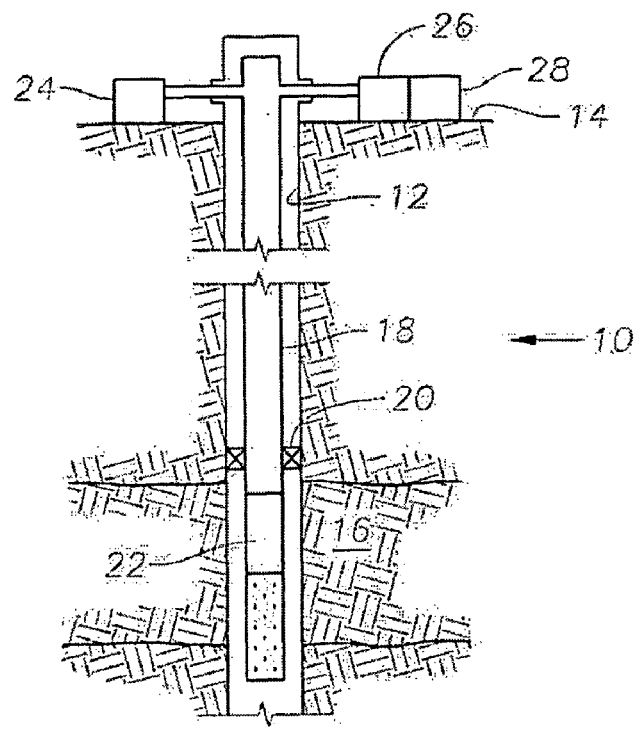
FIGS. 1A-1B are schematic side cross-sectional views of an exemplary cyclic thermal recovery system.

The concepts described herein encompass improvements to the recovery of hydrocarbons from hydrocarbon bearing rock, sands or other geological materials (collectively "rock") using a recovery fluid. Certain embodiments are applicable to improving recovery of high viscosity hydrocarbons, such as heavy oil, tar and others, by using a heated recovery fluid to apply heat to, and thus lower the viscosity of, the hydrocarbons. The concepts described herein are also applicable to other types of hydrocarbon bearing rock.

In certain embodiments, the recovery fluid includes a mixture of miscible compounds, such as an aqueous solution having one or more water-miscible solvents, used alone or with other compositions. Additionally, or alternatively, the mixture may be an azeotrope-forming mixture. An azeotrope is a mixture of two or more compounds that retains the same composition in liquid state as in vapor state. In other words, the ratio of the two or more compounds does not change when a liquid azeotrope is vaporized. By using compounds that are miscible and/or that are azeotrope-forming, the two or more compounds yield a mixture with different and/or improved characteristics over those of one or more of the component compounds in both liquid and vapor states. A number of variations and examples are described below.

It is important to note that, in practice, the presence of contaminants in an otherwise azeotropic mixture slightly upsets the azeotropy. Thus, the terms azeotrope and azeotropic mixture are used herein to refer to mixtures that are ideal azeotropes, as well as mixtures that are substantially azeotropic, but not ideal, because they contain some relatively small amount of contaminant. For example, a binary azeotrope or binary mixture of azeotrope-forming solvents as used herein substantially consists of two compounds, but may have some relatively small amount of contaminant. A ternary azeotrope or ternary mixture of azeotrope-forming solvents as used herein substantially consists of three compounds, but may have some relatively small amount of contaminant. As used herein, an azeotrope-forming mixture is a mixture of two or more compounds that will form an azeotrope, but are not necessarily provided in the azeotropic proportions (weight, molar or volume). The term azeotrope-forming mixture is intended to also encompass mixtures that are forming or have formed an azeotrope. For example, two compounds form an azeotrope at a molar ratio of 95% of one compound and 5% of the other compound. An azeotrope-forming mixture encompasses both a mixture of the compounds in the 95% to 5% mole ratio as well as mixtures with other ratios. As used herein, a compound is miscible in another compound if the compounds form a homogeneous mixture regardless of the amount of either component present.

As will be discussed in more detail below, the concepts herein encompass using a recovery fluid in the recovery of hydrocarbons from rock by introducing the recovery fluid into the rock in-situ (i.e. in the earth) or by introducing the recovery fluid into rock that has been recovered to the surface. The mixture can be introduced into the rock alone or with other compounds that are miscible or form azeotropes or are not miscible or do not form azeotropes. The miscible compounds or azeotrope-forming compounds and any other compounds included therewith make up the recovery fluid. In thermal recovery operations, the recovery fluid can be introduced into the rock or contacted to the hydrocarbon as heated liquid, vapor or both.

The compounds of the recovery fluid can be selected according to the specific application in which the recovery fluid will be used. For example, the compounds can be selected to achieve a specified and/or optimum efficiency of the hydrocarbon, recovery, to change or improve the characteristics of the recovery fluid, and/or to achieve other objectives. The following discussion provides some examples and variations of how the compounds of the recovery fluid can be selected. The examples provided, however, are not exhaustive. Other examples exist and are within the scope of the concepts described herein.

In certain embodiments, the compounds of the recovery fluid can be selected based at least in part on how they interact in different states. For example, in thermal recovery operations, the recovery fluid may be handled or used in a liquid state, a vapor state or both. Thus, the recovery fluid characteristics in both liquid and vapor states can be considered when selecting the compounds. In some instances, the recovery fluid can include miscible compounds alone or in combination with one or more other compounds. Compounds that are miscible, such as water and water-miscible solvents, form a homogeneous mixture in both liquid and vapor states although the ratio of the compounds may be different in different states. In some instances, the recovery fluid can include miscible compounds that are azeotrope-forming. The azeotrope-forming compounds can be provided alone or in combination with one or more other compounds. Miscible compounds that are azeotrope-forming form a homogeneous mixture in both liquid and vapor states, and the portion that forms an azeotrope will achieve a specified ratio (the azeotropic ratio). If the azeotrope-forming compounds are provided in the azeotropic ratio, they will maintain the ratio in both liquid and vapor states. Whether azeotrope-forming or just miscible, any change in ratio may affect the characteristics of the resulting recovery fluid; however, some portion of the recovery fluid substantially operates as a single fluid in both liquid and vapor forms. The portion that operates as a single fluid can have characteristics contributed by both fluids as discussed in more detail below. In contrast, non-miscible compounds may operate separately in both liquid and vapor forms, and some instances, one compound may form a full or partial barrier between the hydrocarbons and the other compounds or compounds in the recovery fluid. The compound forming the barrier effectively insulates the hydrocarbons from the characteristics of the other compounds and may reduce the effectiveness of the recovery fluid by reducing specified effects of the insulated compounds.

In certain embodiments, the thermal characteristics of a recovery fluid, such as heat capacity, boiling point, freezing point and vapor pressure, can be changed by combining the base compound with another compound or compounds that are miscible or that in some compositional ratio form an azeotrope. The thermal characteristics of the resulting mixture will be different from the thermal characteristics of the base compound or mixture. At the azeotropic composition, the azeotrope will act as a single fluid in both liquid and vapor states. For example, in thermal recovery of high viscosity hydrocarbons, it is often desirable to increase the heat capacity and lower the boiling point of the recovery fluid to improve its efficiency as a heat transfer medium. A higher heat capacity enables the fluid to store, and subsequently transmit, more heat into the hydrocarbons and surrounding formation. A lower boiling point enables the fluid to achieve a vapor and begin to store latent heat at a lower temperature. The more heat the recovery fluid can transmit into the hydrocarbons and surrounding formation, the more effective the heated fluid treatment operations will be at mobilizing the hydrocarbons. Achieving a specified change in viscosity of the hydrocarbons (and correspondingly, a change in mobility) with a more efficient recovery fluid, requires less recovery fluid and/or less energy (i.e., fuel) to heat the recovery fluid.

A thermal characteristic of a base compound or mixture can be changed toward a specified value by combining the base compound with a compound or compounds having a thermal characteristic closer to the specified value than the base compound, equal to the specified value, or greater than the specified value. For example, the heat capacity of a base compound or mixture, whether initially an efficient heat transfer medium or not, can be raised by adding compounds that are miscible in or that form an azeotrope with the base compound and have a higher heat capacity than the base compound. Likewise, the heat capacity can be lowered by adding compounds that are miscible in or that form an azeotrope with the base compound and have a lower heat capacity. Although this example is concentrating on only one thermal characteristic, it is likely that combining a base compound with additional compounds will change more than one thermal characteristic of the recovery fluid. Thus, when selecting the compounds of the recovery fluid, the resulting values for a number of thermal characteristics can be taken into account.

In certain embodiments, the recovery fluid may be selected to have other characteristics appropriate for hydrocarbon removal. A solvent property that is particularly appropriate for hydrocarbon removal is the oil/water partitioning coefficient. The oil/water partitioning coefficient P(oil/water) is the ratio, at equilibrium, of the concentration of a compound in oil or a hydrocarbon such as octane to the concentration of the compound in water. In the case of octane and water:

$P$(octane/water)=concentration in octane/concentration in water

The partitioning coefficient (P) is thus the quotient of two concentrations in octane and water, respectively, and may be provided as the logarithm to the base 10 (for example, as LogP(octane/water).

For example, a base compound or mixture that is an efficient heat transfer medium can be mixed with an additional miscible or azeotropic-forming compound or compounds that are solvents to the hydrocarbons or that have a specified octane/water partitioning coefficient. In certain embodiments, the octane/water partitioning coefficient of the additional compounds can be 0.01 or greater, and in some instances 0.1 or greater. The resulting mixture can lower the viscosity of the hydrocarbons by both transferring heat to the hydrocarbons and at least partially dissolving the hydrocarbons. The result is an improvement in the effectiveness of the thermal recovery operations. Such a mixture can achieve a specified change in viscosity of the hydrocarbons using less recovery fluid and/or less fuel to heat the recovery fluid. Because effective solvents may not be efficient heat transfer mediums, or may not be as efficient as other compounds, the compound or mixture selected for its properties as an effective heat transfer medium can at least partially compensate for the deficiency of the solvent in this respect. The mixture may be more efficient at heat transfer than each solvent alone and a better solvent to hydrocarbon than the compound(s) selected for their heat transfer characteristics. Additionally, because the miscible compounds remain mixed in both liquid and vapor states, the mixture may be more effective than a solvent and an efficient heat transfer medium that are co-injected and that do not homogenously mix. For instance, using the barrier example discussed above, a solvent that is co-injected with a more efficient heat transfer medium (the two being non-miscible) can form a barrier between the hydrocarbons and the more efficient heat transfer medium. The barrier insulates the more efficient heat transfer medium and reduces the effectiveness of the co-injected fluids at transferring heat to the formation.

In certain embodiments, the corrosive nature of a base compound or mixture can be mitigated by combining it with another miscible or azeotrope-forming compound or compounds. In one instance, corrosion inhibitors can be added to an efficient heat transfer medium to form a mixture that is less corrosive to equipment used in the hydrocarbon recovery process or in other processes using the recovery fluid than the efficient heat transfer medium alone. If the corrosion inhibitor is miscible in or azeotropic-forming with the base compound, at least a portion of the mixture will remain homogeneously mixed with the base compound in both liquid and vapor states. If the corrosion inhibitor and base compound are in azeotropic proportions, the corrosive nature of the mixture does not change when, for example in thermal recovery operations, the mixture is heated to form vapor.

In certain embodiments, the tendency of a base compound or mixture to oxidize the hydrocarbons can be reduced by combining it with another miscible or azeotrope-forming compound or mixture. In one instance, using miscible azeotrope-forming oxygen scavengers and/or antioxidants with an efficient heat transfer medium yields a mixture that has a reduced tendency to oxidize the hydrocarbon. If the oxygen scavengers and/or antioxidants are miscible in or azeotropic-forming with the base compound or mixture, at least a portion of the mixture will remain homogeneously mixed with the base compound in both liquid and vapor states. If the oxygen scavengers and/or antioxidants are combined with the base compound or mixture in azeotropic proportions, the oxidizing nature of the mixture does not change when the mixture changes state between a liquid and a vapor. It is believed that oxidation of the hydrocarbon contributes to viscosity growth, and thus hinders hydrocarbon recovery.

In certain embodiments, the amount in a recovery fluid of a compound or mixture that is expensive or difficult to obtain, handle and/or dispose of can be reduced by combining it with another miscible or azeotrope-forming compound or mixture. For example, a base compound may have desirable characteristics for thermal recovery operations, but may be expensive or difficult to obtain, handle and/or dispose of. The expense or difficulty can be mitigated by combining the base compound with another miscible or azeotrope-forming compound that is less expensive or difficult to obtain, handle and/or dispose of, but that may or may not have the desirable characteristics to the same degree as the base compound. The resulting mixture may be less expensive or difficult to obtain, handle and/or dispose of than the base compound, and may have improved characteristics for thermal recovery over the second compound.

In certain embodiments, the recovery fluid can include compounds selected to work well with other compounds in the recovery fluid. For example, a first compound or mixture has desirable characteristics for hydrocarbon recovery, but a low affinity for a second compound or mixture. The first compound may be mixed with a third compound or mixture having on a higher affinity for the second compound and that is also miscible in or azeotrope-forming with the first compound. The resulting mixture may then have a higher affinity for the second compound than the first compound alone. Due to the higher affinity, the mixture can more readily mix (azeotropically or not) with the second compound. Likewise, the affinity of a first compound for a second compound can be reduced by mixing the first compound with a third compound that is miscible in or azeotrope-forming with the first compound and that has a lower affinity for the second compound. Due to the lower affinity, the mixture will resist mixing with the second compound. If the added compounds (e.g., third compound) are miscible in or azeotropic-forming with the first compound, at least a portion of the mixture will remain homogeneously mixed with the first compound in both liquid and vapor states. If the added compounds are combined with the first compound in azeotropic proportions, the affinity characteristics of the mixture do not change when the mixture changes state between a liquid and a vapor. In some instances, the affinity of the recovery fluid for corrosion inhibitors, anti-oxidants, oxygen scavengers, and other compounds can be increased by using a mixture of miscible or azeotrope-forming compounds.

Although each of the examples above has been discussed separately, a mixture of miscible or azeotrope-forming compounds may be formulated in accordance with combinations and permutations of some or all of the examples above. For example, azeotropes may be formed with three or more components and/or by selecting components that perform more than one function. For example, a solvent may be selected that also reduces the tendency of the base fluid to oxidize hydrocarbons or changes the affinity of the base for another compound. In another example, an efficient heat transfer medium can be selected to reduce the tendency of a solvent to corrode equipment. It should be understood that other examples exist and are within the scope of the concepts described herein. Also, in certain embodiments, the mixture of azeotrope-forming compounds can be optimized considering a desire to lower or raise the boiling point of the base fluid to make the heat exchange process more efficient, a desire to reduce corrosion of downhole components, and a desire to improve the effectiveness of the viscosity reduction both in terms of reducing the injected fluid volume and heat requirements.

In one embodiment, the recovery fluid includes water. Water is common in heated fluid injection (steam injection) for extraction of high viscosity hydrocarbons, because water is inexpensive, readily available and, due to its high latent heat in vapor form, efficient at transferring heat to the hydrocarbons. There are many water-miscible solvents and many that are azeotrope-forming with the water, particularly those solvents that are able to hydrogen bond with water. Some water-miscible or azeotrope-forming solvents have octane/water partitioning coefficients of 0.01 or greater, and some 0.1 or greater.

One class of solvents that are miscible with water are alcohols (monols and diols). For example, the water miscible compounds or mixtures of azeotropic-forming compounds for use as a recovery fluid can include water and one or more of ethanol, methanol, diacetone alcohol, sec-butyl alcohol, ethylene glycol, hexylene glycol, isopropyl alcohol and/or others. These listed example alcohols are relatively inexpensive and readily available in bulk on the commercial market, thus making them suitable for use in large scale hydrocarbon recovery.

Of the listed example alcohols, ethanol and methanol are fuels. One use for hydrocarbons is as fuel. The portion of the recovery fluid remaining in the recovered hydrocarbon is typically removed from the hydrocarbon in surface based processing operations and treated and/or disposed of. A fuel based water miscible solvent or azeotrope-forming solvent maybe recovered from the hydrocarbons and the fuel used or sold. These water miscible solvents or azeotrope-forming solvents also generally depress the freezing point of water solutions. Another of the listed examples, ethylene glycol and hexylene glycol, substantially lower the freezing point of water and can freeze protect the recovery fluids when stored at the surface in colder climates.

In addition to monols and diols, some azeotropic-forming solvents with water include hydrocarbons, chlorohydrocarbons, carboxylic acids, aldehydes, amines, ketones, and ethers. Specific examples of azeotropic-forming solvents include carbon disulfide, trichloromethane, formaldehyde, formic acid, 1,2-diaminoethane, acetonitrile, propenal, 2-propanone, methyl acetate, methoxyacetaldehyde, propanoic acid, propane, propanol, 2-methoxyethanol, ethylacetate, butane, butanol, butanone, butanoic acid, 1,4-dioxane, 2ethoxyethanol, diethylether, furfural, pyridine, pentane, pentanol, benzene, aniline, phenol, cyclohexanol, hexanol, benzyl alcohol, and dibutyl ether.

It is important to note that although the recovery fluid is discussed in several (though not all) instances above as being a water based, the recovery fluid can include any miscible or azeotrope-forming compounds in any proportion and is not limited to those that are aqueous.

Referring now to FIG. 1A, an exemplary system 10 for thermal recovery of high viscosity hydrocarbons using cyclic heated fluid injection is depicted. FIG. 1 shows a well bore 12 extending from the surface 14 into a subterranean zone 16. The subterranean zone 16 is an interval of or all of a hydrocarbon bearing formation having high viscosity hydrocarbons therein. In one instance, the subterranean zone 16 includes an oil sand, such as a tar sand or bituminous sand. In another instance, the subterranean zone 16 includes a formation with heavy crude oil. In other instances, the subterranean zone 16 can be other hydrocarbon bearing formations.

An injection string 18 extends from about the surface 14 into the subterranean zone 16. In FIG. 1A, the injection string 18 includes a seal 20, such as a packer or other downhole sealing device, selectively actuable into sealing engagement with the wall of the well bore 12. When set, the seal 20 isolates a portion of the well bore 12 in the subterranean zone 16 from the remaining uphole portion of the well bore 12. The injection string 18 additionally includes a downhole heated fluid generator 22 positioned downhole from the seal 20. A reservoir 24 of recovery fluid, such as the recovery fluid described above, is maintained at the surface 14, and can be communicated to the heated fluid generator 22. Likewise, a liquid or gaseous fuel supply 26 and air supply 28 can supply fuel and air to the heated fluid generator 22.

In operation, the seal 20 is set and the heated fluid generator 22 operated to combust the fuel and air. The combustion heats the recovery fluid. In certain embodiments, the recovery fluid is received by the heated fluid generator 22 as a liquid and heated to vaporize at least a portion thereof. The vapor and/or heated recovery liquid are introduced into the subterranean zone 16, and are sometimes introduced along with exhaust from the combustion process.

Of note, the injection string 18 of FIG. 1A is configured for downhole heated fluid generation. In other instances, the injection string 18 can be configured for surface heated fluid generation. If the heated recovery fluid is generated at the surface (via a surface based heated fluid generator), the injection string 18 may omit the downhole heated fluid generator 22, and heated recovery fluid may be communicated down the injection string 18.

Figure 1B:
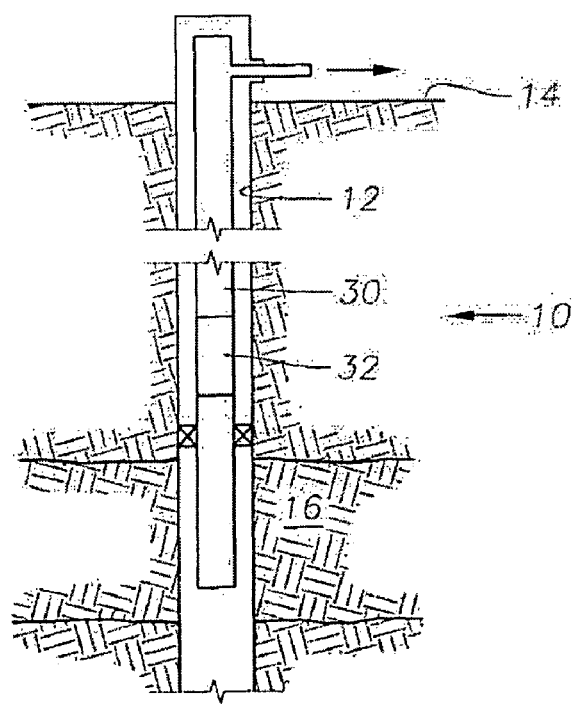

In either instance, downhole or surface heated fluid generation, the heated recovery fluid enters the subterranean zone 16 and operates to lower the viscosity of the hydrocarbons therein. After a specified amount of heated recovery fluid has been introduced into the subterranean zone 16, the injection string 18 is removed from the well bore 12 and well bore 12 is shut-in for a period of time to allow the subterranean zone 16 to soak. Thereafter, as seen in FIG. 1B, a production string 30 is placed in the well-bore 12 and operated to produce hydrocarbons from the subterranean zone 16 to the surface 14. In some instances, the production string 30 may include an artificial lift system 32 (e.g. pump, gas lift or other system) to facilitate the production operations. For example, if the pressure of the subterranean zone 16 is too low to drive the hydrocarbons to the surface 14, the artificial lift system 32 may be operated to produce the hydrocarbons.

After producing for a period of time, the production string 30 may be withdrawn from the well bore 12 and the well permanently shut in. In other instances, the production string 30 may be replaced by the injection string 18, and the injection string 18 used to introduce additional heated fluid into the subterranean zone 16. As above, the injection string 18 is then withdrawn, the well shut-in, and the production string 30 replaced and used to produce hydrocarbons. One or more additional cycles of injection/production may be performed over the life of the well.

Figure 2:
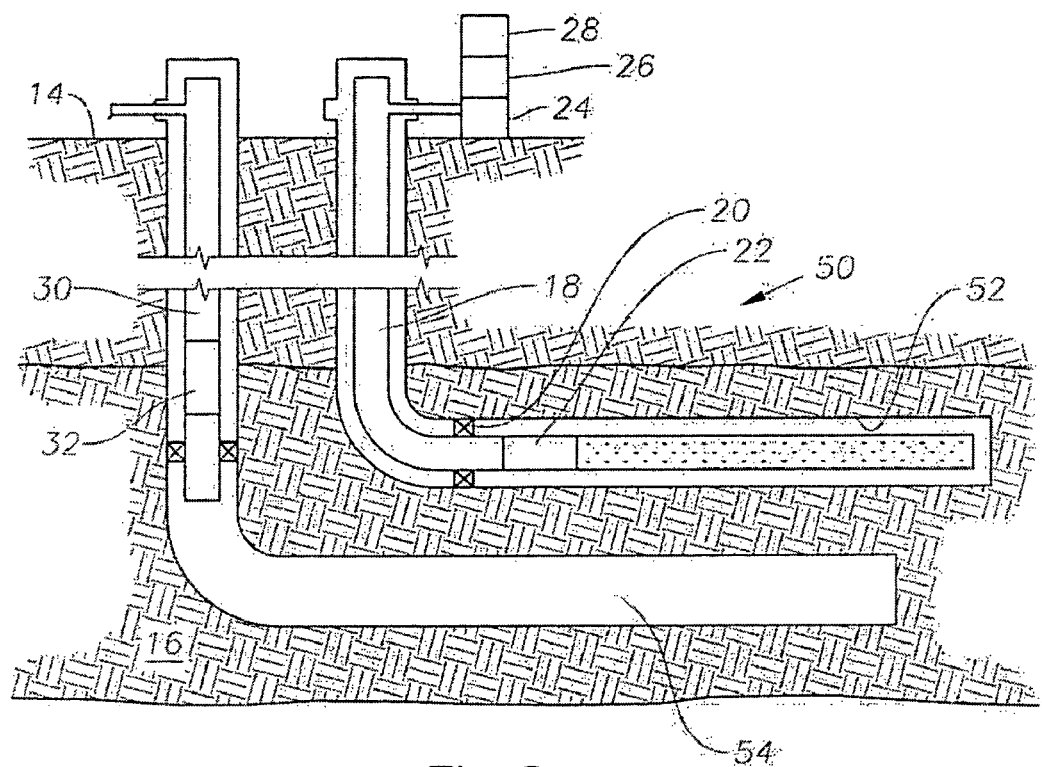
FIG. 2 is a schematic side cross-sectional view of an exemplary vapor assisted gravity drainage thermal recovery system.

Referring now to FIG. 2, an exemplary system 50 for thermal recovery of high viscosity hydrocarbons using vapor assisted gravity drainage is depicted. FIG. 2 shows two well bores, an injection well bore 52 and a recovery well bore 54, extending from the surface 14 into the subterranean zone 16. The injection well bore 52 and the recovery well bore 54 deviate at a high angle from vertical (substantially horizontal shown) and extend substantially parallel to one another in the subterranean zone 16. The injection well bore 52 resides above the recovery well bore 54. An injection string 18 extends from about the surface 14 into the subterranean zone 16 through the injection well bore 52. A production string 30 extends from about the surface 14 into the subterranean zone 16 through the recovery well bore 54. The heated fluid generator 22 receives a supply of fuel (from fuel supply 26), air (from air supply 28) and recovery fluid (from reservoir 24), combusts the fuel and air to generate heat, and applies the heat to the recovery fluid. In certain embodiments, the recovery fluid is received by the heated fluid generator 22 as a liquid and heated to vaporize at least a portion thereof. The vapor and/or heated recovery liquid are then introduced into the subterranean zone 16.

As above, the injection string 18 of FIG. 2 is configured for downhole heated fluid generation, and includes a seal 20 and a downhole heated fluid generator. In other instances, the injection string 18 can be configured for surface heated fluid generation by omitting the downhole heated fluid generator 22. The recovery fluid may then be heated at the surface and communicated down the injection string 18 to the subterranean zone 16.

In either instance, downhole or surface heated fluid generation, the heated recovery fluid enters the subterranean zone 16 about the injection well bore 52 and operates to lower the viscosity of the hydrocarbons surrounding the injection well bore 52. The reduction of viscosity mobilizes the hydrocarbons in the subterranean zone 16 and enables the hydrocarbons to flow, by force of gravity, downward to the recovery well bore 54. The hydrocarbons are then produced to the surface 14 through the recovery well bore 54. As above, in some instances, the production string 30 may include an artificial lift system 32 (e.g. pump, gas lift or other system) to facilitate the production operations. For example, if the pressure of the subterranean zone 16 is too low to drive the hydrocarbons to the surface 14, the artificial lift system 32 may be operated to produce the hydrocarbons.

Figure 3:
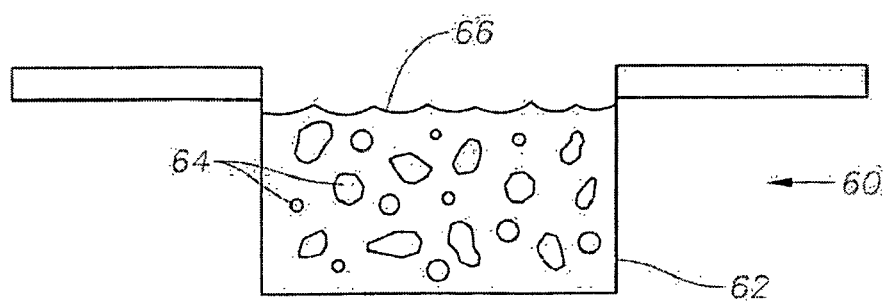
FIG. 3 is a schematic side cross-sectional view of an exemplary surface recovery system.

Referring now to FIG. 3, an exemplary system 60 for thermal recovery of hydrocarbons that have been excavated to the surface is depicted. FIG. 3 shows a separator vessel 62, such as would be in a hydrocarbon extraction plant. The separator vessel 62 holds a mixture of a heated recovery fluid 64 and hydrocarbon bearing rock 64. Although depicted as whole pieces of rock 64, in some instances (e.g., oil sands) the rock 64 and recovery fluid 64 form a slurry. In the separator vessel 62, the recovery fluid 66 acts to reduce the viscosity of the hydrocarbons. In some instances, (e.g., oil sands) the rock 64 dissolves releasing the hydrocarbons. The recovery fluid 66, rock 64 and hydrocarbons separate by weight or by another mechanism in the vessel 62. Thereafter, the hydrocarbons are extracted from the vessel 62.

Although three exemplary systems for recovering hydrocarbons have been discussed above, it is important to note that the recovery fluids in accordance with the concepts herein can be used in numerous other recovery systems. Thus, the concepts described herein are not limited for use in only the specific exemplary systems described above.

Figure 4:
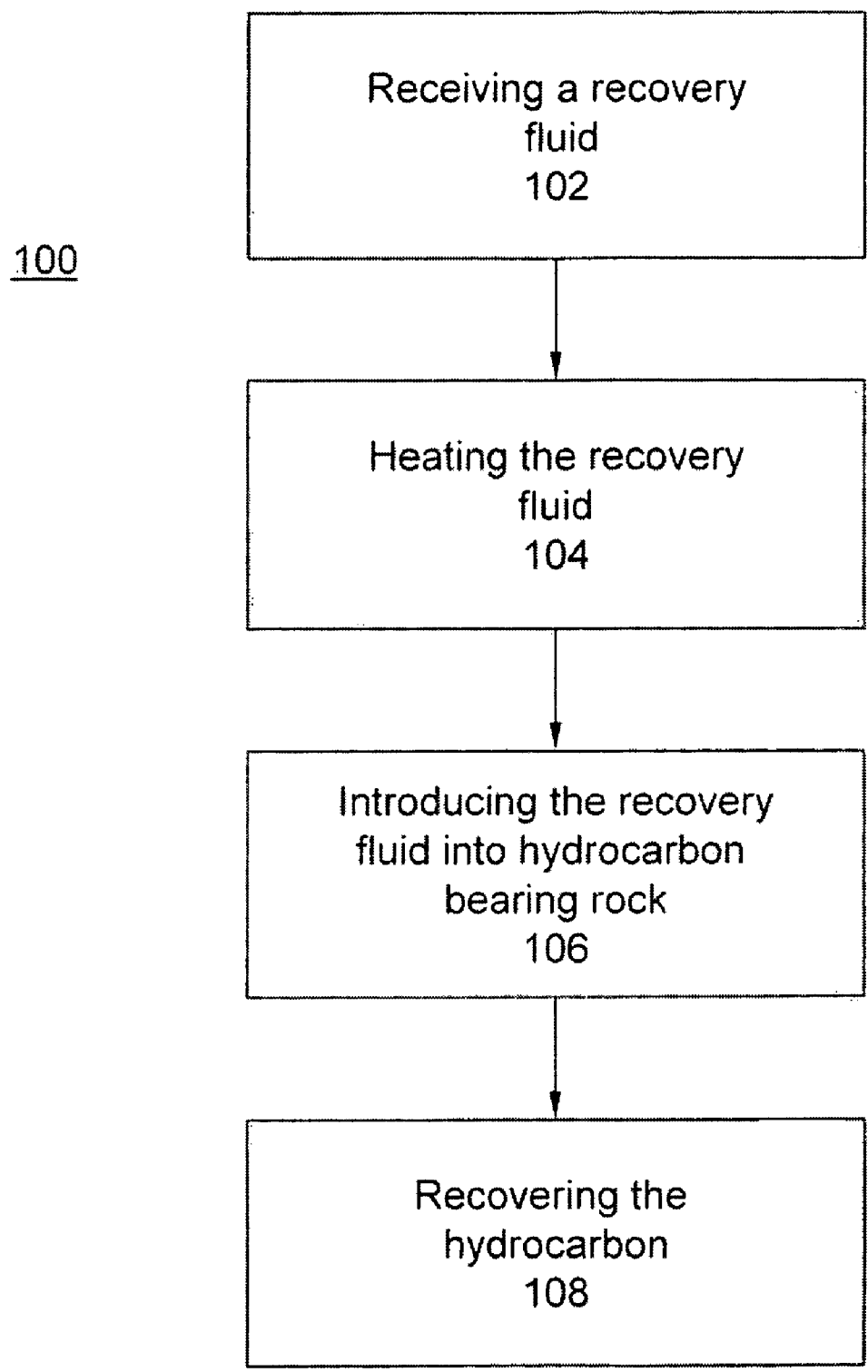
FIG. 4 is a flow diagram of a method for thermal recovery of high viscosity hydrocarbons.

Referring now to FIG. 4, an exemplary method 100 for recovering hydrocarbons from a hydrocarbon bearing rock is described. At operation 102 of the exemplary method 100 a recovery fluid is received. The recovery fluid may be as described above, and include an aqueous solution of water-miscible solvent, a mixture of azeotrope-forming solvents or an azeotrope alone, or may include an aqueous solution of water-miscible solvent, a mixture of azeotrope-forming solvents or an azeotrope and other compounds, azeotropic or not. As discussed above, the compounds of the recovery fluid can be selected according to the specific application in which the recovery fluid will be used. In some instances, the exemplary method 100 further includes selecting the components of the recovery fluid and/or preparing the recovery fluid.

At operation 104 of the exemplary method 100, the recovery fluid is heated. In some instances, for example the embodiments discussed with respect to FIGS. 1A and 2, the recovery fluid is communicated from a source into a well bore and heated downhole. In other instances, the recovery fluid may be heated at the surface. In some instances, the recovery fluid is heated to form a vapor of 100% quality or less.

At operation 106 of the exemplary method 100 the recovery fluid is introduced into a rock, such as a hydrocarbon bearing rock. In some instances, the recovery fluid may be introduced into the rock while the rock resides in-situ (e.g., in the earth), for example as in the embodiments discussed with respect to FIGS. 1A and 2. In the embodiments discussed with respect to FIGS. 1A and 2, the recovery fluid is introduced into the rock through a well bore, but may be introduced into the rock in other manners. In some instances, the recovery fluid may be introduced into the rock after it has been excavated, for example as in the embodiments discussed with respect to FIG. 3. Introducing the recovery fluid into the rock lowers the viscosity of the hydrocarbons therein, and may mobilize the hydrocarbons to facilitate recovery.

At operation 108 of the exemplary method 100 the hydrocarbon is recovered from the rock. When the rock is in-situ and the recovery fluid introduced through a well bore, the hydrocarbon may be recovered from the same well bore through which the recovery fluid was introduced (e.g., FIGS. 1A and 1B) or may be recovered from a different well bore (e.g., FIG. 2). The hydrocarbon may be recovered from the rock and a number of other different manners.

Although depicted in FIG. 4 as occurring in a given order or with certain operations, method 100 can occur in other orders or no order and certain operations can be omitted and/or added. For example, introducing the recovery fluid into the hydrocarbon bearing rock at operation 106 can be performed concurrently with recovering the hydrocarbon at operation 108. In another example, heating the recovery fluid at operation 104 can be performed concurrently with introducing the recovery fluid into the hydrocarbon bearing rock at 106. In another example, heating the recovery fluid at operation 104 can be omitted, such as when the recovery fluid is received already heated or if it is not needed to heat the recovery fluid. It should be appreciated that numerous variations are within the scope of the concepts described herein.

A number of embodiments of the invention have been described. Nevertheless, it will be understood that various modifications may be made without departing from the spirit and scope of the invention. Accordingly, other embodiments are within the scope of the following claims.

What is claimed is:

1. A method, comprising:
    receiving a vaporized recovery fluid comprising an aqueous solution including a water-miscible solvent to hydrocarbons, the water-miscible solvent forming a homogeneous mixture with water regardless of an amount of water or water-miscible solvent; and
    lowering a viscosity of a hydrocarbon in a hydrocarbon bearing rock by contacting at least a portion of the vapor with the hydrocarbon in the rock.

2. The method of claim 1 wherein the rock is in-situ.

3. The method of claim 1 wherein the aqueous solution comprises an azeotrope-forming mixture.

4. The method of claim 1 wherein the aqueous solution comprises an azeotrope.

5. The method of claim 1 wherein water-miscible solvent comprises alcohol.

6. The method of claim 1 wherein the recovery fluid comprises at least one of an antioxidant, an oxygen scavenger or a corrosion inhibitor.

7. The method of claim 1 where the rock comprises at least one of a heavy oil reservoir or an oil sand.

8. The method of claim 1 wherein the vapor is injected from a first well bore in the rock, and the method further comprises producing the hydrocarbons through a second well bore in the rock.

9. The method of claim 1 wherein the vapor is injected from a well bore in the rock, and the method further comprises producing hydrocarbons from the well bore.

10. The method of claim 1 wherein the aqueous solution comprises water and at least one of ethanol, diacetone alcohol, sec-butyl alcohol, or isopropyl alcohol.

11. The method of claim 1 wherein the octane/water partitioning coefficient of the water-miscible solvent is 0.01 or greater.

12. A method, comprising:
receiving a vaporized recovery fluid comprising an aqueous solution including a water-miscible solvent to hydrocarbons; and
contacting at least a portion of the vapor with a hydrocarbon in rock, wherein the octane/water partitioning coefficient of the water-miscible solvent is 0.1 or greater.

13. A method, comprising:
heating a liquid recovery fluid comprising an aqueous solution including a water-miscible solvent, the water-miscible solvent forming a homogeneous mixture with water regardless of an amount of water or water-miscible solvent;
introducing at least a portion of the recovery fluid into a hydrocarbon bearing rock; and
lowering a viscosity of a hydrocarbon in the hydrocarbon bearing rock.

14. The method of claim 13 wherein introducing at least a portion of the recovery fluid into the hydrocarbon bearing rock comprises introducing at least a portion of the recovery fluid in a vapor state.

15. The method of claim 13 wherein the hydrocarbon bearing rock is in-situ.

16. The method of claim 13 wherein the water-miscible solvent is azeotrope-forming with water.

17. The method of claim 13 wherein the water-miscible solvent comprises alcohol.

18. The method of claim 13 wherein heating the liquid recovery fluid is performed in a well bore.

19. The method of claim 18 further comprising recovering hydrocarbons through the well bore or through a second well bore.

20. The method of claim 13 wherein the octane/water partitioning coefficient of the water-miscible solvent is 0.01 or greater.

21. A method, comprising:
heating a liquid recovery fluid comprising an aqueous solution including a water-miscible solvent; and
introducing at least a portion of the recovery fluid into a hydrocarbon bearing rock, wherein the octane/water partitioning coefficient of the water-miscible solvent is 0.1 or greater.

22. A method, comprising:
lowering the viscosity of a hydrocarbon in rock at least in part by raising the temperature of the hydrocarbon with an aqueous solution including a water-miscible solvent to hydrocarbons, the water-miscible solvent forming a homogenous mixture with water regardless of an amount of water or water-miscible solvent; and
recovering the hydrocarbon from the rock.

23. The method of claim 22 wherein lowering the viscosity comprises at least partially dissolving the hydrocarbon.

24. The method of claim 22 wherein the water-miscible solvent is azeotrope forming with water.

25. A method, comprising:
receiving a vaporized recovery fluid comprising an aqueous solution including a water-miscible solvent to hydrocarbons, the water-miscible solvent forming a homogeneous mixture with water regardless of an amount of water or water-miscible solvent and the aqueous solution comprising an azeotrope-forming mixture; and
contacting at least a portion of the vapor with a hydrocarbon in rock.

26. The method of claim 25, wherein the aqueous solution comprises water and at least one of ethanol, diacetone alcohol, sec-butyl alcohol, or isopropyl alcohol.

27. A method, comprising:
receiving a vaporized recovery fluid comprising an aqueous solution including a water-miscible solvent to hydrocarbons, the water-miscible solvent forming a homogeneous mixture with water regardless of an amount of water or water-miscible solvent and the aqueous solution comprising an azeotrope; and
contacting at least a portion of the vapor with a hydrocarbon in rock.

28. A method, comprising:
heating a liquid recovery fluid comprising an aqueous solution including a water-miscible solvent, the water-miscible solvent being azeotrope-forming with water; and
introducing at least a portion of the recovery fluid into a hydrocarbon bearing rock, wherein the octane/water partitioning coefficient of the water-miscible solvent is 0.1 or greater.

29. A method, comprising:
heating, in a well bore, a liquid recovery fluid comprising an aqueous solution including a water-miscible solvent; and
introducing at least a portion of the recovery fluid into a hydrocarbon bearing rock, wherein the octane/water partitioning coefficient of the water-miscible solvent is 0.1 or greater.

30. The method of claim 29 further comprising recovering hydrocarbons through the well bore or through a second well bore.

31. A method, comprising:
receiving a vaporized recovery fluid comprising an aqueous solution including a water-miscible solvent to hydrocarbons, the water-miscible solvent forming a homogeneous mixture with water regardless of an amount of water or water-miscible solvent and having an octane/water partitioning coefficient of 0.01 or greater; and
contacting at least a portion of the vapor with a hydrocarbon in rock.

32. A method, comprising:
heating a liquid recovery fluid comprising an aqueous solution including a water-miscible solvent, the water-miscible solvent forming a homogeneous mixture with water regardless of an amount of water or water-miscible solvent and having an octane/water partitioning coefficient of 0.01 or greater; and
introducing at least a portion of the recovery fluid into a hydrocarbon bearing rock.

* * * * *